United States Patent [19]

Jandel et al.

[11] 4,397,040
[45] Aug. 2, 1983

[54] UHF RECEIVER WITH DECREASED DISTORTION DUE TO MULTIPATH RECEPTION

[75] Inventors: Peter Jandel; Klaus Vathauer, both of Hildesheim, Fed. Rep. of Germany

[73] Assignee: Blaupunkt-Werke GmbH, Hildesheim, Fed. Rep. of Germany

[21] Appl. No.: 111,706

[22] Filed: Jan. 14, 1980

[30] Foreign Application Priority Data

Jan. 24, 1979 [DE] Fed. Rep. of Germany ....... 2902616

[51] Int. Cl.³ .................... H04B 15/00; H04B 17/00
[52] U.S. Cl. .................................. 455/219; 455/211; 455/226; 455/232
[58] Field of Search ............... 455/210, 211, 212, 213, 455/217, 219, 205, 206, 226, 231, 232, 244, 246, 249, 250

[56] References Cited

U.S. PATENT DOCUMENTS

| | | | |
|---|---|---|---|
| 2,602,885 | 7/1952 | Armstrong | 455/213 |
| 2,912,573 | 11/1959 | Michell | 455/210 |
| 2,927,997 | 3/1960 | Day | 455/211 |
| 3,004,156 | 10/1961 | Coleman | 455/213 |
| 3,336,533 | 8/1967 | Glasser | 455/213 |
| 3,654,488 | 4/1972 | Traub | 455/210 |
| 3,869,673 | 3/1975 | Close | 455/226 |
| 3,881,155 | 4/1975 | Saikaishi | 455/226 |
| 4,124,780 | 11/1978 | Ogita | 455/226 |
| 4,328,589 | 5/1982 | Ogita | 455/226 |

Primary Examiner—Tommy P. Chin
Attorney, Agent, or Firm—Frishauf, Holtz, Goodman & Woodward

[57] ABSTRACT

In a UHF receiver in which volume control is carried out as a function of received field strength, distortion due to multipath reception is prevented by use of a band-pass filter connected to the output terminal of the IF section which furnishes a signal indicative of received field strength. The low frequency noise signals appearing at this terminal in the presence of multipath reception frequency noise signals appearing are passed by the band-pass filter and subsequently rectified to create a DC control signal which closes a switch. This in turn increases the time constant of the connecting circuit between the field strength output terminal and the control input of the volume control circuit. The increase in time constant suppresses the above-mentioned low frequency oscillations which occur only during multipath reception, so that the output of the volume control circuit is not affected by such multipath reception.

5 Claims, 1 Drawing Figure

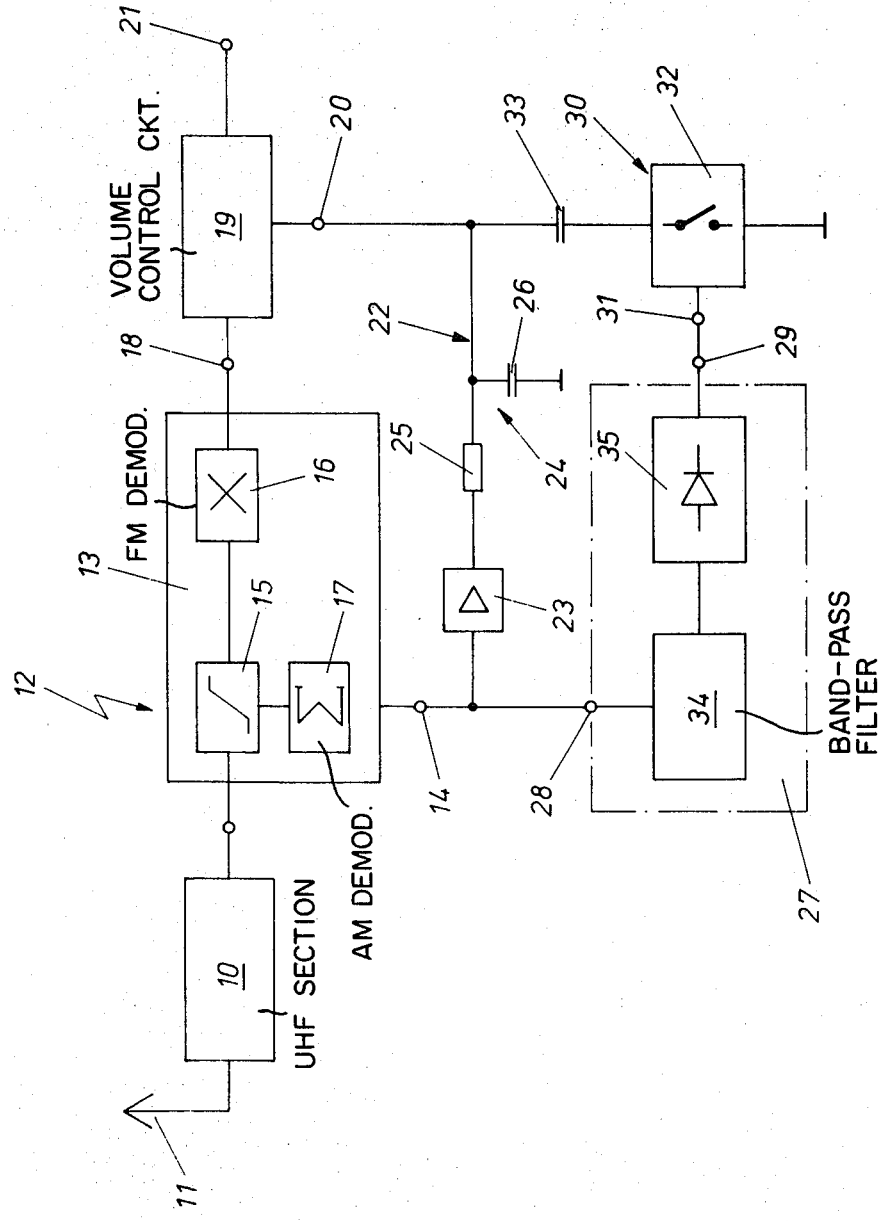

UHF RECEIVER WITH DECREASED DISTORTION DUE TO MULTIPATH RECEPTION

The present invention relates to UHF receivers and, particularly, to FM receivers used in car radios.

BACKGROUND AND PRIOR ART

In known UHF receivers, a volume control is provided which varies the volume in dependence upon the field strength of the received signal. In the absence of a signal received at the antenna or in the presence of a very weak signal, the volume is substantially decreased so that the noise which would otherwise be generated is suppressed. For car radios, it is particularly desirable that the volume control be effected very rapidly following a change in field strength. The line connecting the output terminal of the IF section which furnishes the field strength signal to the control input of the volume control circuit thus has a very small time constant. The field strength signal at the corresponding output terminal of the IF section is first applied to an amplifier. An RC circuit is connected to the output of the amplifier, the time constant of the RC circuit determining the time constant of the connecting line. The control input of the volume control circuit is connected to the common point of the resistor and the capacitor of the RC circuit.

If now two high frequency carrier oscillations are received at the antenna of the UHF receiver which originate from the same point but which, due to different transit times, have different modulation content, a so-called multipath reception results. This multipath reception causes, among other things, an amplitude modulation of the received signals which means that the signal is both amplitude and frequency modulated. As a result, distortion of a greater or lesser degree will occur.

These low frequency amplitude modulations also affect the field strength signal. This in turn causes a modulation of the volume control signal which again causes distortion.

THE INVENTION

It is an object of the present invention to furnish a multipath signal indicative of multipath reception, in response to which the distortions resulting from multipath reception will be eliminated.

It is a further object of the present invention to furnish a multipath signal generating circuit which operates precisely and reliably but is simple and inexpensive to construct.

In accordance with the invention, a multipath signal furnishing apparatus comprises band-pass filter means connected to the output of the IF section furnishing the field strength signal, and rectifier means connected to the output of the band-pass filter means. The band-pass filter is tuned to frequencies which are particularly indicative of multipath reception. Preferably, the lower frequency limit is selected so that the low frequency field strength changes which result from movement of the car do not result in an output from the rectifier. The upper frequency limit is so chosen that interference from neighboring transmitters will not pass.

In particularly preferred embodiments, the frequency of the band-pass filter is limited to 19 kHz or/and 57 kHz. These frequencies represent auxiliary carrier frequencies of stereo or ARI transmitters which tend to predominate the amplitude modulation during multipath reception.

The so-generated multipath signal may be used to control a circuit which increases the time constant of the above-mentioned connecting line between the field strength output terminal of the IF section and the control input of the volume control circuit. Specifically, if an amplifier is connected to the field strength output terminal of the IF section and an RC circuit is connected to the output of this amplifier, then the time constant of the RC circuit is changed during multipath reception so that the RC circuit constitutes a low pass filter which suppresses the noise frequencies which are superimposed on the field strength signal during such multipath reception.

The time constant of the RC circuit may be changed in a simple manner by activating an electronic switch which connects a second capacitor in parallel with the capacitor of the RC circuit.

DRAWING ILLUSTRATING A PREFERRED EMBODIMENT

The single FIGURE is a block diagram of a UHF receiver incorporating the present invention.

The UHF receiver has a UHF section 10 whose input is connected to an antenna 11 and whose output is connected to an intermediate frequency section 12. This IF section 12 is an integrated circuit 13 and has a field strength output terminal 14. The integrated FM-IF circuit 13 includes a limiting amplifier 15, an FM demodulator 16 and an AM demodulator 17. The output of the amplifier 15 is connected to the input of the AM demodulator 17 whose output constitutes the field strength output 14 of the integrated circuit 13. The output of FM demodulator 16 is connected to an output terminal 18 which, in turn, is connected to the input of a volume control circuit 19. Volume control circuit 19 has a control input terminal 20 and an output terminal 21. Output terminal 21 is connected to the low frequency section of the UHF receiver.

For volume control as a function of received field strength, the control input 20 of volume control circuit 19 is connected to output terminal 14 of IF section 13 through a transmission or connecting line 22. An amplifier 23 is connected in line 22. Connecting line 22 has a small time constant which is determined by an RC circuit 24 connected to the output of amplifier 23. RC circuit 24 includes a resistor 25 and a capacitor 26 connected in series to each other, the series connection being connected in parallel to the output of amplifier 23. The control input of volume control circuit 19 is connected to the common point of resistor 25 and capacitor 26.

The circuit for detecting, and furnishing the multipath signal indicative of multipath reception is denoted by reference numeral 27 and has an input terminal 28 connected to output terminal 14 of IF section 13. Circuit 27 has an output terminal 29 at which the multipath signal is furnished during multipath reception at the antenna.

A time constant regulator unit 30 having an input 31 connected to terminal 29 causes the time constant of RC circuit 24 to be increased in response to the multipath signal. Specifically, in a preferred embodiment, circuit 30 comprises an electronic switch 32 which closes in response to the multipath signal and causes a capacitor 33 to be (e.g. C26=47 μF) connected in parallel with capacitor 26. (e.g. C33=0.47 μF)

Circuit 27 includes a band-pass filter 34, and a rectifier 35 connected to the output of the band-pass filter.

The lower limiting frequency of band-pass filter 34 is in the order of several kHz, while its upper limiting frequency is less than 100 kHz. These limiting frequencies are so chosen that changes in the signal at terminal 14 resulting from field strength changes due to the movement of the car in which the receiver is located are blocked by band-pass filter 34 and, further, that interference which is the result of transmitters located in the vicinity of the car will also be blocked. In a preferred embodiment, band-pass filter 34 has an extremely small band-pass centered around either 19 kHz and/or 57 kHz. These frequencies, which are auxiliary carrier frequencies transmitted by stereo or ARI transmitters, tend to predominate in the amplitude modulation resulting from multipath reception.

OPERATION

As mentioned previously, circuit 19 controls the volume as a function of received field strength so that loud noises in the speaker during weak or missing antenna signals are suppressed. Especially when the receiver is located in an automobile, it is desirable that this volume regulation take place very rapidly following a change in field strength. RC circuit 24 therefore has a relatively low time constant, that is the capacity of capacitor 26 is relatively small. (e.g. R25=15 k$\Omega$; C26=47 $\mu$F) The field strength signal derived from terminal 14 is amplified in amplifier 23 and is then derived at the common point of resistor 25 and capacitor 26 and applied to control input 20 of volume control circuit 19. If two high frequency carrier oscillations are received at antenna 11 which originate at the same point but, due to different transit times, have different modulation content, the so-called multipath reception results. This multipath reception leads to an amplitude modulation of the received signals. This amplitude modulation is detected by AM demodulator 17 and is superimposed as a low frequency oscillation on the signal at terminal 14. This low frequency oscillation is applied to input terminal 28 of band-pass filter 34. This low frequency oscillation is within the band-pass of band-pass filter 34. Thus, filter 34 detects the low frequency amplitude modulation of the signal at terminal 14. A signal is therefore applied to the input of rectifier 35, causing a DC output signal to appear at terminal 29. This DC output signal, the multipath signal, causes switch 32 to close, connecting capacitor 33 in parallel with capacitor 26. This increase in capacitance causes RC circuit 24 to act as a low pass filter which blocks the low frequency oscillations appearing at terminal 14 due to multipath reception from control input 20 of volume control circuit 19. The distortion in the output signal of volume control circuit 19 due to multipath reception is therefore prevented. As soon as the multipath reception ceases, no signal appears at terminal 29, switch 32 opens and capacitor 33 is again disconnected from the circuit.

Various changes and modifications may be made within the scope of the inventive concepts.

We claim:

1. In a UHF-FM receiver, particularly FM car radio, having
    an intermediate frequency (IF) section including
    amplitude demodulator means (17) having an output (14) strength signal indicative of the field strength of the signal received by said receiver, said field strength signal having amplitude modulation superimposed thereon only in the presence of multipath reception and automatic volume control means (19) having a signal input connected to said IF section and a control input;
    and means (22, 23-26) for connecting said control input of said volume control means to said output (14) furnishing said field strength signal, said connecting means including means (25, 26) for establishing a predetermined time constant;
    apparatus (27) for detecting multipath reception and furnishing a multipath signal indicative of said multipath reception connected to said demodulator means output (14), comprising
    band-pass filter means (34) connected to said amplitude demodulator means for furnishing a filter output signal only in response to a field strength signal having said amplitude modulation; and
    rectifier means (35) connected to said band-pass filter means and having a multipath signal output (29) for furnishing said multipath signal in response to said filter output signal; and
    means (32, 33) connected to and controlled by said rectifier means (35) for increasing the time constant of said connecting means (22, 23-26) in response to said multipath signal.

2. A UHF receiver as set forth in claim 1, wherein said band-pass filter means has a lower frequency limit of several kHz and an upper limiting frequency of less than 100 kHz.

3. A UHF receiver as set forth in claim 1, wherein said band-pass filter means has a band-pass limited to 19 kHz.

4. A UHF receiver as set forth in claim 1, wherein said band-pass filter means is limited to a frequency of 57 kHz.

5. A UHF receiver as set forth in claim 1, wherein said time constant establishing means comprises a first capacitor (26); and
    wherein said time constant increasing means comprises a second capacitor (33), and switch means (32) operative in response to said multipath signal for connecting said second capacitor in parallel with said first capacitor.

* * * * *